United States Patent [19]

McClain et al.

[11] Patent Number: 6,049,874
[45] Date of Patent: *Apr. 11, 2000

[54] SYSTEM AND METHOD FOR BACKING UP COMPUTER FILES OVER A WIDE AREA COMPUTER NETWORK

[75] Inventors: Fred W. McClain, Del Mar; Thomas B. Bolt, Encinitas, both of Calif.

[73] Assignee: Fairbanks Systems Group, San Diego, Calif.

[ * ] Notice: This patent is subject to a terminal disclaimer.

[21] Appl. No.: 09/041,149

[22] Filed: Mar. 12, 1998

Related U.S. Application Data

[63] Continuation-in-part of application No. 08/757,134, Dec. 3, 1996, Pat. No. 5,794,254.

[51] Int. Cl.[7] ........................................................ H04L 9/00
[52] U.S. Cl. .............................. 713/176; 713/1; 713/200; 707/204; 395/182.04
[58] Field of Search .................................... 711/161, 162; 707/204; 713/200; 380/4

[56] References Cited

U.S. PATENT DOCUMENTS

| | | | |
|---|---|---|---|
| 3,711,863 | 1/1973 | Bloom | 444/1 |
| 3,715,734 | 2/1973 | Fajans | 340/173 |
| 4,361,832 | 11/1982 | Cole | 340/505 |
| 4,377,000 | 3/1983 | Staab | 371/11 |
| 4,491,934 | 1/1985 | Heinz | 364/900 |
| 4,558,302 | 12/1985 | Welch | 340/347 |
| 4,616,315 | 10/1986 | Logsdon et al. | 364/200 |
| 4,641,274 | 2/1987 | Swank | 364/900 |
| 4,654,819 | 3/1987 | Stiffler et al. | 364/900 |
| 4,686,620 | 8/1987 | Ng | 364/200 |
| 4,727,509 | 2/1988 | Johnson et al. | 364/900 |
| 4,792,896 | 12/1988 | Maclean et al. | 364/200 |
| 4,807,182 | 2/1989 | Queen | 364/900 |
| 4,819,154 | 4/1989 | Stiffier et al. | 364/900 |
| 4,881,075 | 11/1989 | Weng | 341/87 |
| 4,893,307 | 1/1990 | McKay et al. | 370/94.1 |
| 4,910,666 | 3/1990 | Nibby, Jr. et al. | 364/200 |
| 4,914,576 | 4/1990 | Zelley et al. | 364/200 |
| 5,008,936 | 4/1991 | Hamilton et al. | 380/50 |
| 5,043,871 | 8/1991 | Nishigaki et al. | 364/200 |
| 5,051,947 | 9/1991 | Messenger et al. | 364/900 |
| 5,060,185 | 10/1991 | Naito et al. | 364/900 |
| 5,133,065 | 7/1992 | Cheffetz et al. | 395/575 |
| 5,155,845 | 10/1992 | Beal et al. | 395/575 |
| 5,163,148 | 11/1992 | Walls | 395/600 |

(List continued on next page.)

FOREIGN PATENT DOCUMENTS

| | | | |
|---|---|---|---|
| 0 541 281 A2 | 12/1993 | European Pat. Off. | G06F 11/08 |
| WO 94/17474 | 8/1994 | WIPO | G06F 11/14 |

*Primary Examiner*—Tod R. Swann
*Assistant Examiner*—Trevor Quick Coddington
*Attorney, Agent, or Firm*—John L. Rogitz

[57] ABSTRACT

A system backs up computer files to a remote site via modem, LAN, WAN, or other network device 16. Files of a user computer that are found in a common library at the remote site initially are not copied to the remote site, whereas files not in the library are copied to the remote site and potentially automatically added to the library when a sufficient number of computers contain the files. Then, periodically or continuously if the user is online via the modem, the user computer determines which blocks have been changed, and the user computer transmits only changed blocks to the remote site. The blocks are gathered in "chunk" files, and when a chunk file reaches a predetermined size, it is transmitted to the remote site for updating the back up version of the respective file. The process then resumes identifying changed blocks. In addition to flagging the changed block for transfer, the process resynchronizes the local data file with the backed up version using a two-step comparison, first comparing the first two characters in the block with a pre-stored character set, and then, if the first comparison results in a match, comparing a digital signature of the changed block with a pre-stored signature. If either comparison results in a mismatch, the test is repeated using, as the first byte of the test block, the next byte in the sequence. Novel encryption procedures are also disclosed.

10 Claims, 5 Drawing Sheets

U.S. PATENT DOCUMENTS

| | | | |
|---|---|---|---|
| 5,193,154 | 3/1993 | Kitajima et al. | 395/250 |
| 5,202,982 | 4/1993 | Gramlich et al. | 395/600 |
| 5,210,866 | 5/1993 | Milligan et al. | 395/575 |
| 5,212,772 | 5/1993 | Masters | 395/200 |
| 5,212,784 | 5/1993 | Sparks | 395/575 |
| 5,235,601 | 8/1993 | Stallmo et al. | 371/40.1 |
| 5,239,637 | 8/1993 | Davis et al. | 395/425 |
| 5,239,647 | 8/1993 | Anglin et al. | 395/600 |
| 5,239,659 | 8/1993 | Rudeseal et al. | 395/800 |
| 5,241,668 | 8/1993 | Eastridge et al. | 395/575 |
| 5,263,154 | 11/1993 | Eastridge et al. | 395/575 |
| 5,274,802 | 12/1993 | Altine | 395/600 |
| 5,274,807 | 12/1993 | Hoshen et al. | 395/650 |
| 5,276,860 | 1/1994 | Fortier et al. | 395/575 |
| 5,276,865 | 1/1994 | Thorpe | 395/575 |
| 5,278,838 | 1/1994 | Ng et al. | 371/10.1 |
| 5,293,613 | 3/1994 | Hayden et al. | 395/575 |
| 5,295,258 | 3/1994 | Jewett et al. | 395/575 |
| 5,321,832 | 6/1994 | Ianaka et al. | 395/600 |
| 5,347,653 | 9/1994 | Flynn et al. | 395/600 |
| 5,357,607 | 10/1994 | Sathi et al. | 395/166 |
| 5,367,698 | 11/1994 | Webber et al. | 395/800 |
| 5,375,232 | 12/1994 | Legvold et al. | 395/575 |
| 5,404,508 | 4/1995 | Konrad et al. | 395/600 |
| 5,416,840 | 5/1995 | Cane et al. | 380/4 |
| 5,435,004 | 7/1995 | Cox et al. | 395/575 |
| 5,438,671 | 8/1995 | Miles | 395/200 |
| 5,446,871 | 8/1995 | Shomler et al. | 395/180 |
| 5,448,718 | 9/1995 | Cohn et al. | 395/404 |
| 5,454,099 | 9/1995 | Myers et al. | 395/575 |
| 5,475,834 | 12/1995 | Anglin et al. | 395/600 |
| 5,479,654 | 12/1995 | Squibb | 395/600 |
| 5,495,533 | 2/1996 | Linehan et al. | 380/21 |
| 5,497,483 | 3/1996 | Beardsley et al. | 395/575 |
| 5,506,986 | 4/1996 | Healy | 395/600 |
| 5,513,314 | 4/1996 | Kandasamy et al. | 395/182.04 |
| 5,513,351 | 4/1996 | Grantz | 395/600 |
| 5,515,502 | 5/1996 | Wood | 395/182.13 |
| 5,546,534 | 8/1996 | Malcolm | 395/182.04 |
| 5,548,750 | 8/1996 | Larsson et al. | 395/600 |
| 5,559,991 | 9/1996 | Kanfi | 395/489 |
| 5,564,037 | 10/1996 | Lam | 395/488 |
| 5,566,331 | 10/1996 | Irwin, Jr. et al. | 395/600 |
| 5,574,906 | 11/1996 | Morris | 395/601 |
| 5,584,023 | 12/1996 | Hsu | 395/620 |
| 5,586,322 | 12/1996 | Beck et al. | 395/616 |
| 5,594,900 | 1/1997 | Cohn et al. | 395/600 |
| 5,596,706 | 1/1997 | Shimazaki et al. | 395/182.04 |
| 5,604,862 | 2/1997 | Midgely et al. | 395/182.04 |
| 5,606,693 | 2/1997 | Nilsen et al. | 395/610 |
| 5,615,364 | 3/1997 | Marks | 395/618 |
| 5,623,662 | 4/1997 | McIntosh | 395/619 |
| 5,640,561 | 6/1997 | Satoh et al. | 395/618 |
| 5,649,089 | 7/1997 | Kilner | 395/182.04 |
| 5,649,196 | 7/1997 | Woodhill et al. | 395/620 |
| 5,659,614 | 8/1997 | Bailey, III | 380/4 |
| 5,659,743 | 8/1997 | Adams et al. | 395/621 |
| 5,664,186 | 9/1997 | Bennett et al. | 395/620 |
| 5,668,986 | 9/1997 | Nilsen et al. | 395/610 |
| 5,668,991 | 9/1997 | Dunn et al. | 395/618 |
| 5,671,350 | 9/1997 | Wood | 395/182.13 |
| 5,673,381 | 9/1997 | Huai et al. | 395/180 |
| 5,675,725 | 10/1997 | Malcolm | 395/182.04 |
| 5,708,820 | 1/1998 | Park et al. | 395/750 |
| 5,713,024 | 1/1998 | Halladay | 395/712 |
| 5,765,173 | 6/1998 | Cane et al. | 707/204 |
| 5,778,395 | 7/1998 | Whiting et al. | 707/204 |
| 5,794,254 | 8/1998 | McClain | 707/204 |
| 5,799,141 | 8/1998 | Galipeau et al. | 395/182.11 |
| 5,864,853 | 1/1999 | Kimura et al. | 707/10 |

SYSTEM AND METHOD FOR BACKING UP COMPUTER FILES OVER A WIDE AREA COMPUTER NETWORK

RELATED APPLICATIONS

The present application is a continuation-in-part of U.S. patent Ser. No. 08/757,134, filed Dec. 3, 1996, U.S. Pat. No. 5,794,254 granted Aug. 11, 1998, for an invention entitled "SYSTEM AND METHOD FOR BACKING UP COMPUTER FILES OVER A WIDE AREA COMPUTER NETWORK", from which priority is claimed.

FIELD OF THE INVENTION

The present invention relates generally to computer file back up systems, and more particularly to automated computer file back up systems.

BACKGROUND

Extraordinarily large amounts of information are stored on electronic media, such as personal computer hard disk drives and other well-known data storage media. Increasingly, the information is exclusively stored on such media; no "hard" (i.e., paper) copies exist for much information. It can readily be appreciated that such so-called "paperless" information storage systems consume less space and virtually no natural resources, in contrast to systems that require information to be stored on paper. Unfortunately, it is not uncommon for electronic data storage media to "crash", i.e., to become damaged or otherwise lose its information. Such information loss can be devastating to the information owner and highly costly.

Accordingly, many computer system managers routinely make back up copies of computer files. Typically, once each day (or at some other specified periodicity) a system manager will cause the computer system to copy files that are resident on the hard disk drives of the system onto storage media such as other hard disk drives or magnetic tape. Should a file or entire hard disk drive in the system be damaged, lost, or otherwise rendered inaccessible, the back up copy of the file that is stored on, e.g., the storage tape can be copied back into the system.

Such back up systems suffer from several drawbacks. First, they usually require user interaction to initiate the back up process, and consequently occupy the time of a person who must undertake the tedious chore. Further, systems which back up computer files and store the files in the same premises as the system being backed up are of little value in the event of a catastrophe such as a fire or flood. This is because the backed up file copies can be expected to perish along with the files that are resident in the system, thereby rendering the back up system a failure.

An example of an alternate back up system is disclosed in U.S. Pat. No. 5,479,654, which teaches sending changed portions of computer files via modem to an off-site electronic storage facility. As taught in the 5,479,654 patent, segments of computer files are checked for changes that have been made since the previous back up. This check first consists of comparing a so-called "exclusive-OR" ("XOR") product of the file against an XOR value that was calculated previously for the stored back up version of the file. If the XORs do not agree, a file change is indicated, and the changed portion of the file is sent via modem, LAN, WAN, or other network device to the off-site facility.

On the other hand, if the XORs do agree, a second, more rigorous check is made to determine whether the segment has been changed since the last back up. The second check consists of comparing a cyclic redundancy check (CRC) product of the segment against a previously recorded CRC value. If the CRCs do not match, a file change is indicated, and the changed portion of the file is sent via modem, LAN, WAN, or other network device to the off-site facility. Otherwise, the segment is assumed to have not been changed since the last back up.

Unfortunately, the system disclosed in the 5,479,654 patent can require two calculations per check. Each calculation consumes computing time, and as recognized by the present invention, it is consequently desirable to minimize the number of calculations undertaken to determine whether a change has been made to a computer file. As further recognized herein, it is nevertheless desirable to undertake an initial "quick and dirty" check to reduce the number of computationally rigorous checks that must be made.

Moreover, as recognized by the present invention it is necessary to manage the transmission of data to the off-site storage facility, to avoid one user interfering with the back up operations of another user. Still further, the present invention recognizes that some files need not initially be backed up at all. And, the present invention recognizes that file restoration can be provided for in more than one way to reduce the time required to restore lost files to a computer system.

In addition to the above considerations, the present invention recognizes that data backup undertaken at predetermined intervals might risk failing to backup data that is generated and lost between the intervals. Fortunately, the present invention recognizes that data backup via wide area networks can be undertaken as a user is actively using a computer, thereby providing real time and, hence, almost completely up to date data backup.

Moreover, when data is to be transmitted via wide area networks, the data is preferably first encrypted for security reasons. The present invention recognizes that the longer a user employs a single key for encrypting data, the greater the risk that the key will be broken. For this reason, it is preferably to use more than one key to encrypt data. Unfortunately, in the context of data backup over time, the present invention understands that the use of more than one key over a period of time is rendered somewhat difficult because it is difficult during subsequent decryption to associate the correct encryption key with the blocks that were originally encrypted with the key. As recognized herein, however, it is possible to facilitate the use of more than one encryption key to thereby reduce the risk of encryption system compromise. The present invention still further recognizes that in addition, it is desirable and possible to provide a session-unique key for each transmission session that cannot be broken unless every bit of data to be transmitted is known a priori.

Accordingly, it is an object of the present invention to provide a system and method for backing up computer files at predetermined intervals or continuously, as he computer is being used. Another object of the present invention is to provide a system and method for backing up computer files to a remote facility via modem, LAN, WAN, or other network device. Still another object of the present invention is to provide a system and method for backing up computer files by automatically sending only changed portions of the files to an off-site facility. Yet another object of the present invention is to provide a system and method for backing up computer files that is easy to use and cost-effective. Another object of the present invention is to provide easy to use and effective encryption processes for backing up data via a wide area network. Yet another object of the present invention is to provide a data backup system which automatically updates a centrally stored common software library.

SUMMARY OF THE INVENTION

A computer program product includes a computer program storage device that is readable by a digital processing system and a program means on the program storage device. As intended by the present invention, the program device is realized in a critical machine component that causes the digital processing system to perform method steps to back up at least some blocks in at least one local computer file from at least one user computer in a computer network. In accordance with the present invention, the method steps include transmitting the local file to a data center that is remote from the user computer to render a remote version, with the data center being accessible via the computer network. For each of the blocks (i.e., each sequence of two thousand (2000) or so bytes) in the local file, two respective characters thereof are copied, with the characters defining a respective first comparison value. Additionally, the method steps include generating respective digital signature codes defining second comparison values.

Moreover, the method steps include, for each block, periodically determining a test digital signature code and comparing it to the respective second comparison value. A block of the local file is designated as a transmission block to be transmitted to the data center to thereby update the remote version when the test digital signature code of the block does not equal the second comparison value of the block.

In a preferred embodiment, the method steps further include determining whether the first two characters of the block, starting at a test byte$_i$, equal one of the first comparison values, wherein i=a natural number, when the test digital signature code of a block does not equal the respective second comparison value. Furthermore, the method steps include determining a block digital signature code using the test byte$_i$ as the first byte of a test block when the first two characters of the block equal one of the first comparison values, and determining whether the block digital signature code equals one of the second comparison values. When the block digital signature code equals one of the second comparison values, the method returns "resynchronized". Otherwise, when either the first two characters of the block do not equal one of the first comparison values, or when the block digital signature code does not equal one of the second comparison values, the method sets i=i+1 and repeats the steps of this paragraph.

The method steps may further include gathering transmission blocks in a transfer chunk. When the size of the transfer chunk equals a predetermined size, the transfer chunk is transmitted to the data center. Preferably, transfer chunks are transmitted to the data center only during a predetermined period. Still further, the method steps may additionally include, for each local file block, determining whether a duplicate of the local file block is stored in a common file library at the data center. The file block is copied to the data center only when a duplicate of the local file block is not stored in a common file library.

In preferred embodiments, the method steps yet further include periodically copying remote versions of file blocks at the data center onto a portable data storage medium. Local files are restored by copying remote versions of file blocks from the portable data storage medium when the remote versions that are stored on the portable data storage medium are at least as current as the remote versions stored at the data center, and otherwise they are restored by copying remote versions of the file blocks from the data center.

The computer program product is also disclosed in combination with the digital processing apparatus, and in further combination with the computer network. A computer-implemented method using the above-described steps is also disclosed.

In another aspect, a system is disclosed for backing up files in user computers. The system includes a data center including a library of common computer file blocks, and a plurality of user computers remote from the data center and in communication with the data center. Common library logic means determine, for each user computer, which if any of the file blocks of the user computer are common file blocks by virtue of being contained in the common library. Also, initialization logic means are associated with each user computer for causing file blocks except common file blocks to be transmitted to the data center. And, subfile incremental back up logic means are associated with each user computer for determining changed blocks that have been changed since a predetermined back up time. Changed block signals are generated in response thereto. Chunk transmission logic means are responsive to the subfile incremental logic means for sending only changed blocks to the data center in chunks having a predetermined size. As disclosed in further detail below, synchronizing logic means are responsive to the changed block signals for synchronizing the subfile incremental logic means.

In another aspect, a computer program product includes a computer program storage device readable by a digital processing system and logic means on the program storage device. The logic means include instructions that are executable by the digital processing system for performing method steps for backing up at least some blocks in at least one local computer file from at least one user computer in a computer network. The method steps performed by the computer program product include transmitting the local file to a data center remote from the user computer to render a remote version. The data center is accessible via the computer network and has an electronic storage capacity of at least one hundred terabytes. The local file is transmitted only when the data center does not have an exact copy of the local file.

In another aspect, a system for backing up files in user computers includes a data center including a common library of computer data and a plurality of user computers remote from the data center and in communication with the data center. Further, common library logic means determine which if any of data blocks of the user computers are common computer file blocks by virtue of being contained in the common library, it being understood that computer file blocks that are determined not to be common computer file blocks are non-common file blocks. Common library addition means are provided for adding, to the common library, a non-common file block when the non-common file block appears at least a predetermined number of times in the user computers.

In another aspect, a computer-implemented method for backing up at least one local computer file from at least one user computer in a computer network includes transmitting the local file to a data center remote from the user computer to render a remote version. Changes to a first block of the local file are received, it being understood that the changes are established by a user of the user computer generating input events. Immediately upon receiving the changes, at least the first block is designated as a transmission block to be transmitted to the data center for updating the remote version. The method then includes transmitting at least the first block to the data center substantially while the user is generating input events.

In another aspect, a computer-implemented method for backing up computer file blocks includes, at a user computer, encrypting at least one block using one or more encryption keys. The method further includes storing the one or more encryption keys in a key file, and transmitting the block to a remote data center. Next, the method contemplates, at a restore time, transmitting the block from the data center to the user computer, and selecting one of the keys from the key file. The block is decrypted with the key, and the method then determines whether the decryption was successful. When the decryption is not successful, another key is selected from the key list and the data is decrypted, and the above steps repeated until the decryption is successful.

In another aspect, a method for providing a session key for a transmission session for transmitting data between a transmitting computer and a receiving computer includes generating a digital signature unique to the data, and using the digital signature to encrypt the data.

In another aspect, a method for backing up data in a system including user computers and at least one data storage facility includes, at a user computer, determining whether data associated with the user computer is resident in a common software library associated with the data storage facility. The data is not backed up when the data is resident in the common software library. Otherwise, the data is automatically added to the common software library when the data is present in at least a predetermined number of user computers in the system.

In another aspect, a method is disclosed for backing up computer data in a computer system including user computers and a data storage facility online with a wide area network. The method includes, for at least one user computer online with the wide area network, as data is entered into the user computer during input events, transmitting at least part of the data to the data storage facility via the wide area network between input events.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
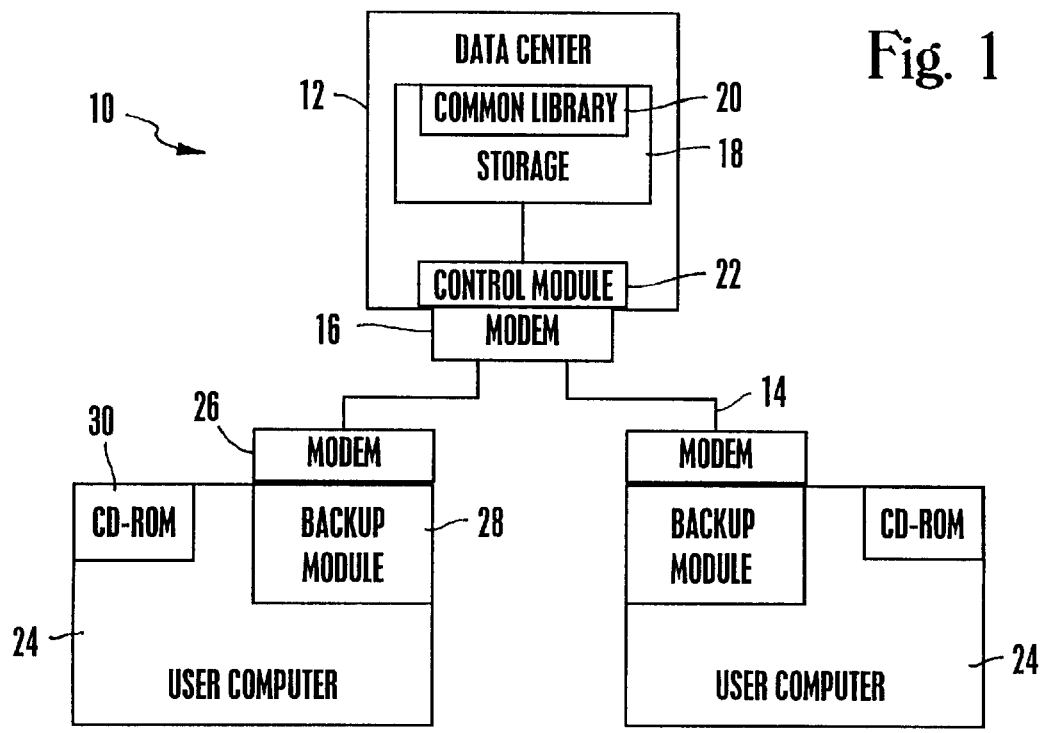
FIG. 1 is a schematic diagram of the computer file back up system of the present invention.

Referring initially to FIG. 1, a system is shown, generally designated 10, which includes a server computer, referred to herein as a data center 12, which is part of a computer network. In the preferred embodiment, the data center 12 is part of the computer network 14 referred to as the Internet, and the data center 12 can communicate with other computers on the network 14 via a modem, LAN, WAN, or other network device 16.

As shown in FIG. 1, the data center 12 includes an electronic data storage repository 18 with an associated common library 20. Preferably, to permit scaling of the system 10 to support a large number of users, the data repository 18 has a multi-terabyte or indeed a petabyte capacity. Preferably, the capacity of the repository 18 is over one hundred terabytes, and more preferably is five hundred terabytes or more. A control module 22 controls the flow of data into and out of the repository 18 in consonance with the novel logic described below.

Figure 5:
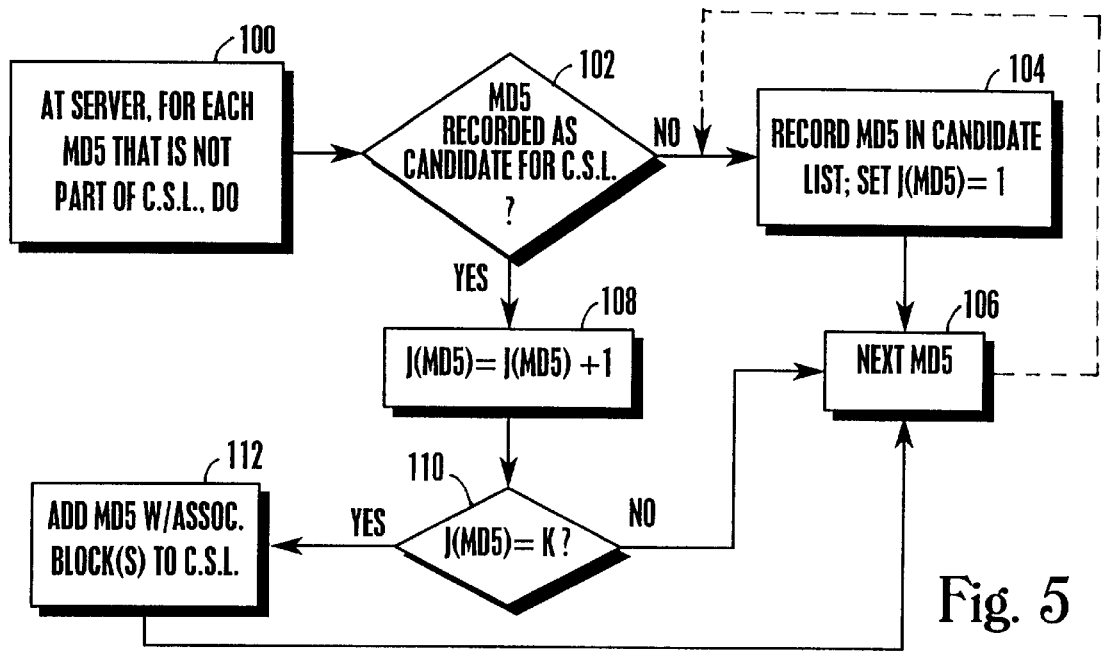
FIG. 5 is a flow chart of the process for automatically updating the common software library.

Per the present invention, the common library 20 stores the blocks of computer files that are widely distributed and used by many users and, hence, that are common to many users. For example, the common library 20 can store copies of well-known off-the-shelf personal computer operating systems, network browsers, and so on. The common library 20 can be automatically updated as discussed further below in reference to FIG. 5. As intended by the present invention, the data storage repository 18 with common library 20 can be physically implemented in a suitable medium, such as magnetic tape, hard disk arrays, compact disk read-only memory (CD-ROM), DASD arrays, or even floppy diskettes.

Plural user computers 24, e.g., personal computers or laptop computers, communicate with the network 14 via respective user modems 26 or other appropriate network connection in accordance with well-known principles. In the preferred embodiment, each user computer 24 includes a respective software-implemented back up module 28 that undertakes the inventive steps of the present invention. It is to be understood that in another embodiment, the back up modules 28 can be remote from, but accessible to, the user computers 24. Additionally, each user computer 24 preferably includes a respective CD-ROM drive 30 for purposes to be made clear shortly. As those skilled in the art will recognize, the user computers 24 can also be associated with respective video monitors, printers, and other output devices, and keyboards, keypads, mice, and other input devices.

FIGS. 2–8 illustrate the structure of the back up module 30 of the present invention as embodied in computer program software. Those skilled in the art will appreciate that the Figures illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown in the Figures.

These instructions may reside on a program storage device including a data storage medium to establish a computer program product, such as a programmed computer diskette. Alternatively, such media can also be found in semiconductor devices, on magnetic tape, on optical disks, on a DASD array, on a conventional hard disk drive, on electronic read-only memory or on electronic random access memory, or other appropriate data storage device. In an illustrative embodiment of the invention, the logic means are computer-executable instructions that are written in C++ language code.

Figure 2:
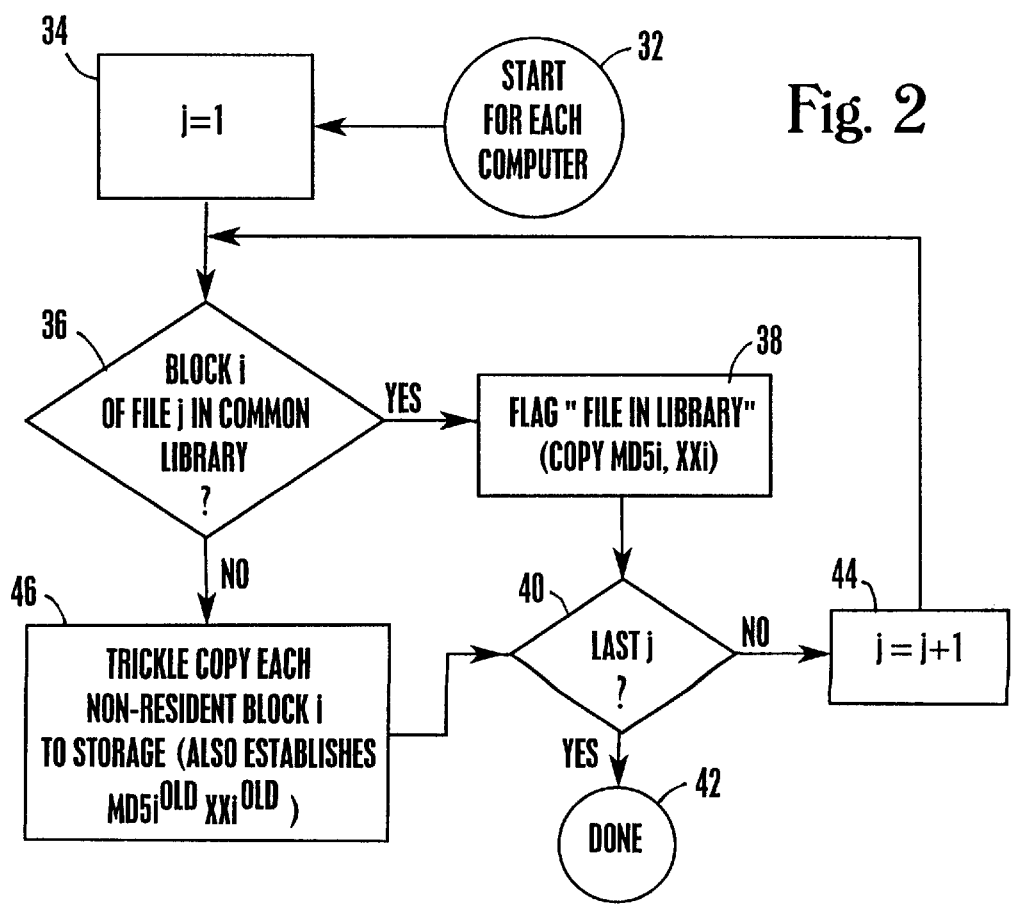
FIG. 2 is a flow chart of the initialization process.

Referring now to FIG. 2, the initialization process can be understood. The process begins at start state 32 for each user computer 24 and moves to block 34, wherein a file index counter "j" is set equal to unity. Moving to decision diamond 36, it is determined whether a copy of the $j^{th}$ file, using the so-called "message digest five" ("MD5") code discussed further below, is already stored in the common library 20. This can be done on a file-by-file basis by comparing the MD5 of each $j^{th}$ file to the MD5s of the files in the common library 20. For each file that is stored in the common library 20, as indicated by a match of a file's MD5 with one of the MD5s of the files in the library 20, the process moves to block 38 to flag the file as being in the common library and, hence, not a candidate for wholesale transfer to the data center 12.

Alternatively, greater granularity can be achieved by comparing the MD5 of each block of each $j^{th}$ file to a list of common block MD5s, and flagging only those blocks having MD5s that match an MD5 on the common library 20 list of MD5s as being in the common library and, hence, not candidates for wholesale transfer to the data center 12. Thus, it is to be understood that in the event that the $j^{th}$ file as it exists in the user computer 24 has been modified from the common, off-the-shelf version in the common library 20, the modified portions will be detected and transferred to the data center 12 during the subfile incremental procedure discussed below in reference to FIG. 3.

In any case, it can now be appreciated that the use of the common library 20 avoids the necessity of transmitting to the data center 12 very large, off-the-shelf computer files that are resident on many if not most personal computer systems and that would otherwise require backing up. In other words, the common library 20 reduces the time and cost of making initial copies of the files in the user computers 24.

Additionally, at block 38 a block-by-block comparison value listing is recorded that has two entries for every block$_i$ (wherein "i" is a block index counter) of every files$_j$ flagged as being in the common library 20. The first entry is the first two characters ("$XX_1$") of the first byte of each block$_i$. In contrast, the second entry is a digital signature ("MD5$_i$"), the value of which is uniquely defined by the contents of the block$_i$. The first entry establishes a first comparison value, and the second entry establishes a second comparison value.

As mentioned above, in the presently preferred embodiment, the digital signature used is the 128 bit-long "message digest five" ("MD5") code known in the cryptology art. As recognized by the present invention, the MD5 code of a block changes a great deal with even very small changes of the block. Thus, the digital signature of the present invention advantageously is more sensitive to changes in a block than are check sums, cyclic redundancy codes, and so-called "exclusive or" codes.

From block 38, the logic proceeds to decision diamond 40 to determine whether the last file in the user computer 24 has been tested. If so, the initialization process terminates at state 42. Otherwise, the process moves to block 44 to increment by one the file index counter "j", and then to loop back to decision diamond 36.

In contrast, if it is determined at decision diamond 36 that a copy of the $i^{th}$ block of the $j^{th}$ file is not in the common library 20, the logic proceeds to block 46 to trickle copy each non-resident block$_i$ of the file$_j$ to the storage repository 18 of the data center 12. By "trickle copy" is meant that the non-resident blocks of the file are transmitted to the data center 12 during a predetermined transmission period, also referred to herein as a "window", until the entire non-resident portions file has been transmitted, or until the transmission period elapses. Alternatively, as discussed below in reference to FIG. 8, the data to be backed up can be transmitted real time as the user inputs data to the user computer 24, provided the user computer 24 is online with the network 14.

If the transmission period elapses before the non-resident portion of the file has been transmitted in its entirety, the respective back up module 28 completes the transmission of the chunk, and then terminates. If the transmission is interrupted during the transmission period, the module 28 notes the value of the block index counter "i", such that transmission can be resumed from there during the next transmission period. Then, at the start of the next transmission period, the back up module 28 increments the block index counter "i" by unity and commences transmitting the file$_j$ where it previously had left off. As indicated in FIG. 2, the block-by-block listing of $XX_i$ and $MD5_i$ is generated at block 46 as described previously in reference to block 38. From block 46, the logic proceeds to decision diamond 40 to function as previously described.

Figure 3:
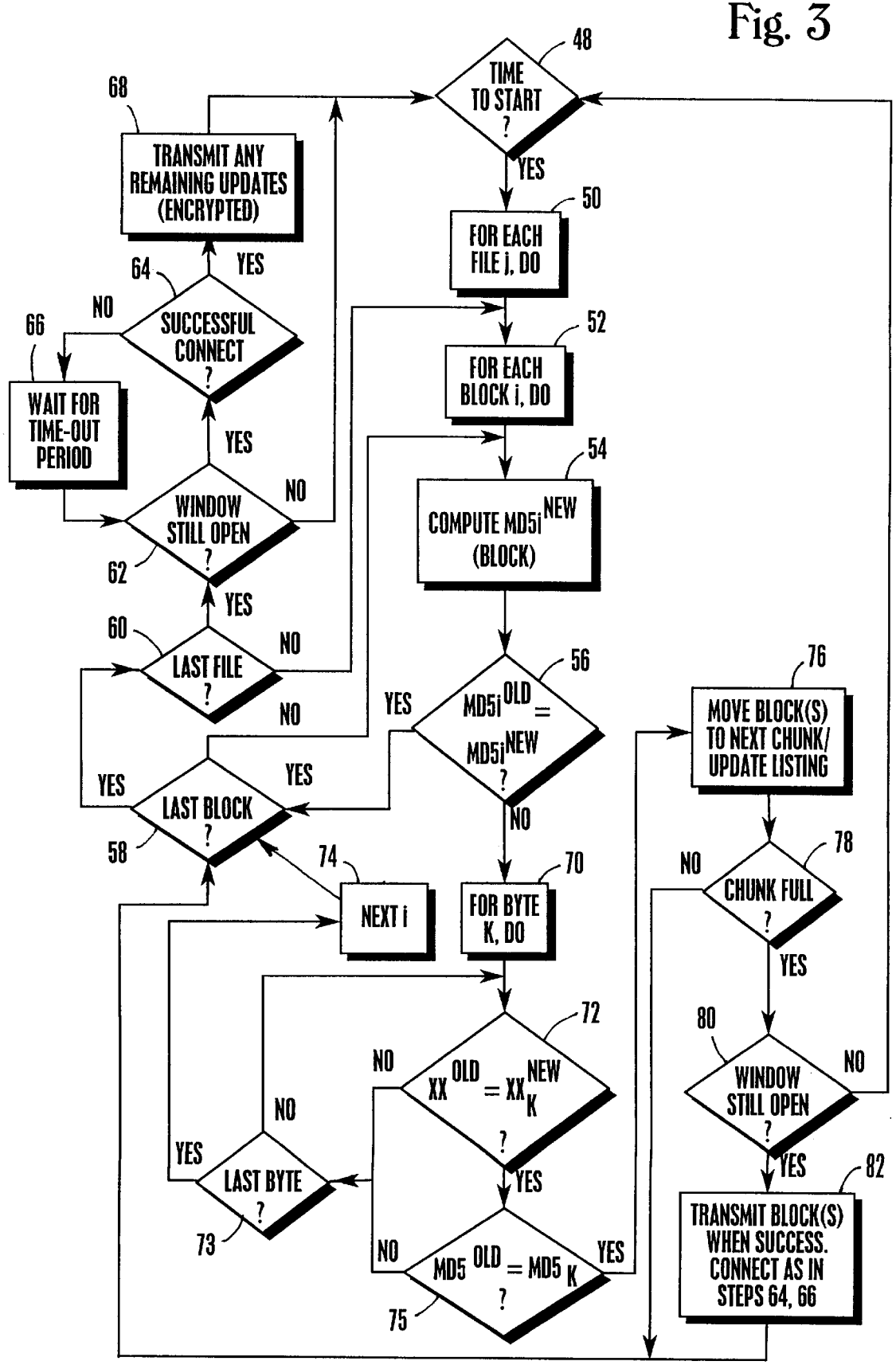
FIG. 3 is a flow chart of the subfile incremental back up process.

Turning now to FIG. 3, the subfile incremental back up logic can be seen. It is to be understood that as intended by the present invention, periodically (e.g., on a daily basis) the back up module 28 of each user computer 24 will undertake the process discussed below.

Commencing at decision diamond 48, it is determined whether a user-selected predetermined back up period has commenced. When it has, the process moves to block 50 to enter a do loop for each file$_j$ that has been designated by the user to be backed up. Then, the process moves to block 52 to enter a do loop for each block$_i$ of the file$_j$ that was selected at block 50.

Moving to block 54, the back up module 28 computes the digital signature $MD5_i^{new}$ of the block$_i$ under test. Next, the digital signature $MD5_i^{new}$ of the block$_i$ under test is compared, at decision diamond 56, with the digital signature $MD5_i^{old}$ that is recorded in the listing that was generated in FIG. 2, as described above.

It is to be understood that the listing of digital signatures $MD5^{old}$ is an ordered list from i=0 to n, wherein n=number of digital signatures in the list. It is to be further understood that the digital signature $MD5_i^{new}$ of the block$_i$ under test is first compared to the $i^{th}$ $MD5^{old}$ in the list, and if it doesn't match, the digital signature $MD5_i^{new}$ of the block$_i$ under test is next compared to the next $MD5^{old}$ in the ordered list (i.e., the $i^{th}+1$ $MD5^{old}$), and so on, until a match is found, or until the end of the ordered list has been reached. When a match is found anywhere in the list, the test at decision diamond 56 is positive, and the process moves to decision diamond 58. Also, when a match is found at the $l^{th}$ position in the list, wherein l>i, the comparison of the $MD5_{i+}1^{new}$ of the $i^{th}+1$ block to be tested is first compared to $MD5_{l+}1^{old}$, i.e., to the $l^{th}+1$ element in the ordered list of old digital signatures. If no match is found, the $MD5_{i+}1^{new}$ of the $i^{th}+1$ block is then serially tested against the digital signatures in the list after the $l^{th}+1$ element in the ordered list of old digital signatures.

Returning to the discussion of the $i^{th}$ block, when a digital signature match is found, indicating that no change was made to the block$_i$ under test since the last back up, the process moves to decision diamond 58. At decision diamond 58, the logic determines whether the last block of the file$_j$ has been tested, and if not, the process loops back to retrieve the next block$_i$ and compute its digital signature as shown and described. In other words, if further blocks exist for the file$_j$ under test, the index counter "i" is incremented by one, and the process loops back to block 54.

If, on the other hand, the last block of the file$_j$ has been tested, the logic determines, at decision diamond 60, whether the last file in the user computer 24 has been tested. If not, the process loops back to retrieve the next file and proceed as before to test the blocks in the file. Otherwise, the process moves to decision diamond 62.

At decision diamond 62, it is determined whether the back up period has not elapsed, i.e., whether the allocated back up window is still open. If the period has elapsed, the logic loops back to decision diamond 48 to await the commencement of the next allocated back up period. In contrast, if the back up window is still open, the logic attempts to establish communication with the data center 12 via the modems 26, 16 (or other network devices, such as LANs, WANs, etc.).

At decision diamond 64, it is determined whether the communication connection was successful. If it wasn't, the logic moves to block 66 to wait a predetermined time-out period (preferably five minutes) before looping back to decision diamond 62 to retry the connection if the window is still open. In any case, when it is determined that communication has been established between the user computer 24 and the data center 12 subsequent to testing all files$_j$ in the user computer 12, the logic encrypts and compresses any remaining updated blocks (described further below) and transmits them to the data center 12, at block 68. From block 68, the process loops back to decision diamond 48.

Returning to the negative loop originating at decision diamond 56, when the digital signature of the block$_i$ does not match one of the signatures stored in the listing for the block, a change to the block$_i$ is indicated, and the block$_i$ therefore becomes a candidate for back up. Additionally, the process resynchronizes itself with the block-by-block comparison value listing discussed above.

Accordingly, after a negative test at decision diamond 56 (i.e., when the logic essentially returns a "changed block" signal), the logic moves to block 70, wherein a do loop is entered for the bytes$_k$ of the block$_1$. "k" is an index counter initially equal to unity. Moving to decision diamond 72, the logic determines whether the first two characters ("XX$_k^{new}$") of the block starting with the byte$_k$ under test equal the first comparison value ("XX$^{old}$") that corresponds to the block$_i$ in the comparison value listing. It is to be understood that the comparison value listing parallels the ordered list of digital signatures MD5$^{old}$. Consequently, if the first comparison does not yield a match, similar to the testing at decision diamond 56 the two characters XX$_k^{new}$ are compared to the next two characters XX$^{old}$ in the ordered list until a match is found or until the end of the list is reached.

When the end of the list of comparison values is reached without a match, the logic moves to decision diamond 73 to determine whether the current byte$_k$ is the last byte of the candidate block under test. Stated differently, at decision diamond 73 the logic determines whether the byte index counter "k" equals about two thousand forty eight (2048). If it does, the logic moves to block 74 to increment the block index counter "i" by unity, and then the logic loops proceeds to decision diamond 58. In this instance, the entire block under test is flagged for copying. If it is determined that the byte index counter "k" does not equal one thousand at decision diamond 73, the logic loops back to increment "k" by unity and test the next byte in the block$_i$ at decision diamond 72.

If, however, it is determined at decision diamond 72 that "XX$_k^{new}$" equals an "XX$^{old}$", the logic proceeds to decision diamond 75. At decision diamond 75, the digital signature MD5 of the block having as its first byte the byte$_k$ under test is determined and compared to the second comparison value, i.e., the digital signature MD5$^{old}$ that corresponds to the matched characters XX$^{old}$ in the comparison value listing. As was the case with the test at decision diamond 56, the digital signature MD5 being tested is tested against subsequent digital signatures MD5$^{old}$ in the ordered list, if necessary, to find a match. If no match is found, the logic moves to decision diamond 73.

If, however, the digital signature MD5 of the block having as its first byte the byte$_k$ under test is determined to be equal to one of the digital signatures MD5$^{old}$ in the ordered list at decision diamond 75, the logic returns "resynchronized" and moves to block 76. In other words, a positive test at decision diamond 75 indicates that the logic has found an old, unchanged block that previously has been backed up, and, hence, that the logic is resynchronized with the comparison value listing.

At block 76, the changed block(s) (also referred to herein as "transmission blocks") are moved to a "next chunk" file. Additionally, at block 76 the comparison value listing is updated to include the first two characters and digital signatures of the changed block(s), for use as the first and second comparison values, respectively, during the test of the blocks during the next back up cycle. Moving to decision diamond 78, it is determined whether the chunk file is full. In the presently preferred embodiment, the chunk file is full when its size is five megabytes (5 MB).

If the chunk file is not full, the logic returns to decision diamond 58. In contrast, if the chunk file is full, the process moves to decision diamond 80 to determine whether the back up period has not elapsed, i.e., whether the allocated back up window is still open. If the period has elapsed, the logic loops back to decision diamond 48 to await the commencement of the next allocated back up period. In contrast, if the back up window is still open, the logic transmits the chunk when a successful connection has been established with the data center 12, using the procedure of steps 64 and 66 discussed above. From block 82, the logic returns to decision diamond 58.

Figure 4:
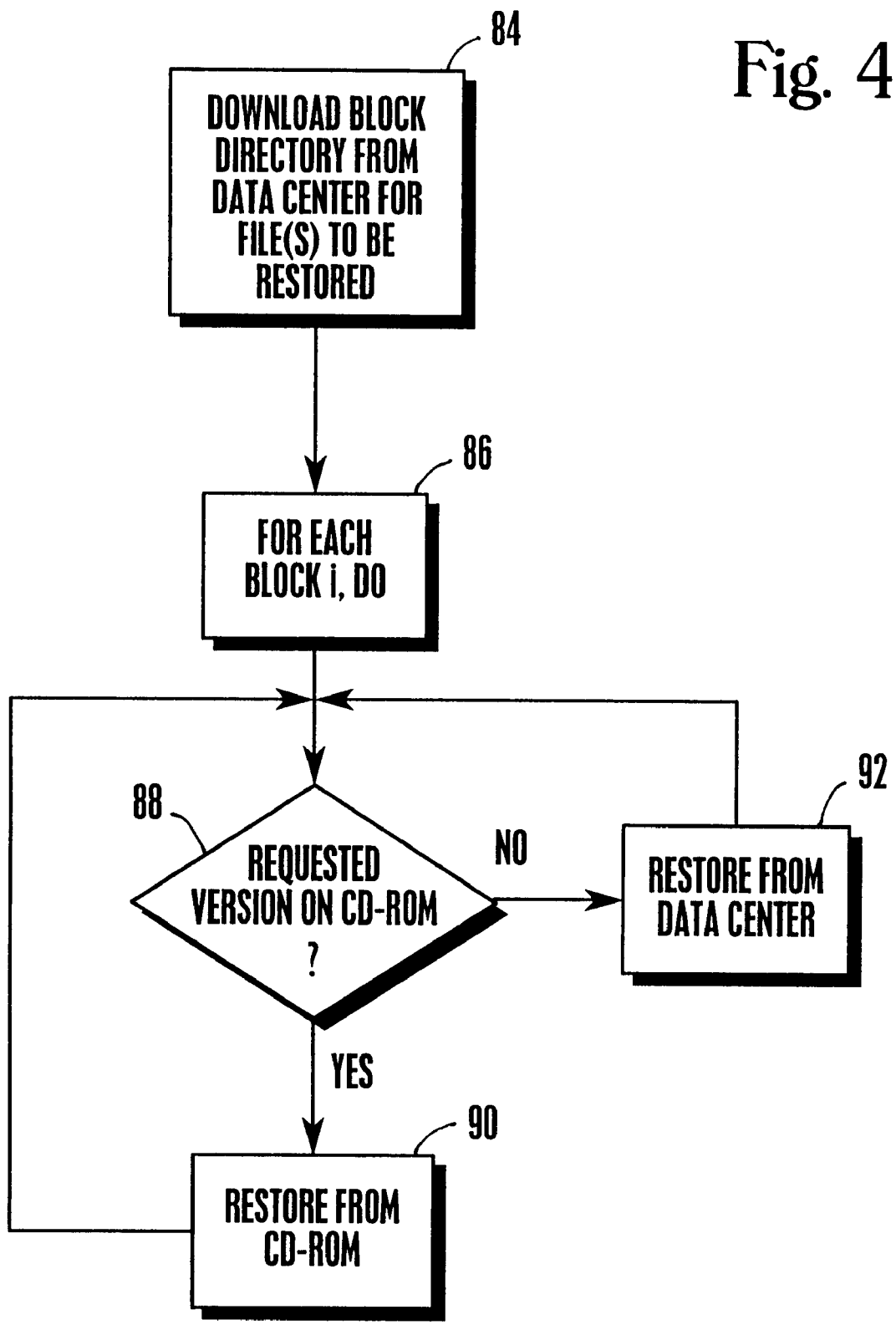
FIG. 4 is a flow chart of the restore process.

FIG. 4 shows the logic by which lost files may be restored to a user computer 24. It is to be understood that as envisioned herein, backed up file blocks at the data center 12 are periodically (e.g., weekly, monthly, quarterly, etc.) copied from the storage repository 18 to CD-ROM disks, and the disks then transported to the same physical location as the associated user computer 24. Hereinafter, these CD-ROM disks are referred to as "local back up disks".

At block 84, a directory of blocks in the data center 12 that correspond to the user computer 24 is downloaded from the data center 12. Next, at block 86 a do loop is entered for each block$_i$ of the lost file(s) as follows. It is determined at decision diamond 88 whether the requested version of the block of the file (ordinarily the latest version) is on the local back up disks. If so, the block is preferentially restored from the local back up disks at block 90. Otherwise, it is restored via the modems 26, 16 from the data center 12 at block 92.

From block 90 or block 92, the logic loops back to retrieve the next block$_i$, and continues this process until the entire requested files have been restored.

Further inventive features of the present invention can be appreciated in reference to FIGS. 5–8. With particular regard to FIG. 5, the common software library 20 shown in FIG. 1 may be automatically updated by commencing at block 100 in FIG. 5. At block 100, the server (i.e., at the data center 12 shown in FIG. 1) undertakes, for each digital signature MD5 code with its attendant block received for storage, a loop by moving to decision diamond 102, wherein it is determined whether the digital signature MD5 code under test has been recorded as a candidate for the library 20. The first time the particular digital signature MD5 code is received from any user computer, the test at decision diamond 102 is negative, and the process consequently moves to block 104 to record the digital signature MD5 code on a candidate list. Also, a counter $J_{MD5}$ for the particular digital signature MD5 code under test is set equal to unity at block 104. Moving from block 104 to block 106, the next received digital signature MD5 code is retrieved and the above process repeated as indicated by the dashed loop back line in FIG. 5.

On the other hand, when the digital signature MD5 code previously has been received from a user computer, the test at decision diamond 102 is positive, and the process moves to block 108 to increment the counter $J_{MD5}$ that is associated with the digital signature MD5 code under test by one. It is to be understood that the counter $J_{MD5}$ that is associated with the digital signature MD5 code under test can be incremented whenever the digital signature MD5 code under test is received from any user computer, or only when it received from a user computer that has not previously sent the digital signature MD5 code under test.

Then, at decision diamond 110 it is determined whether the value of the counter $J_{MD5}$ that is associated with the digital signature MD5 code under test equals a predetermined value "k". If not, the process loops back to block 106, but otherwise the process moves to block 112 to add the digital signature MD5 code under test, along with its associated block(s), to the common software library 20. The process then loops back to block 106 to retrieve the next digital signature MD5 code.

Figure 6A:
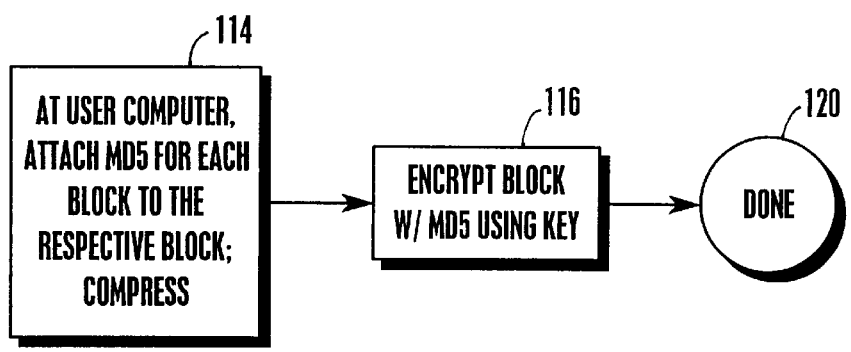
FIG. 6A is a flow chart of the process for encrypting data to be backed up.
Figure 6B:
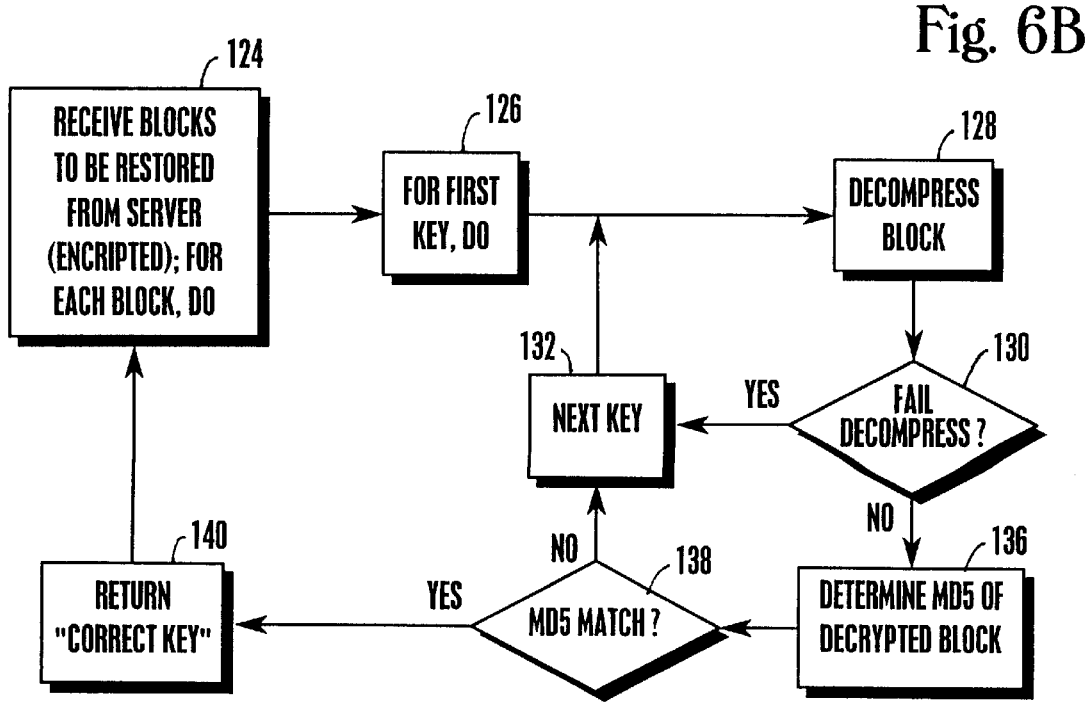
FIG. 6B is a flow chart of the process for decrypting backed up data received from the data center.

FIGS. 6A and 6B show the present inventive steps for allowing a user to use multiple encryption keys to transmit data for back up, thereby increasing security. Commencing at block 114, at a user computer, the digital signature MD5 code for each block for which backup has been selected by the steps disclosed above in FIGS. 2–4 is determined and attached to its respective data block, and then the digital signature MD5 code with data block is compressed using compression principles known in the art. Moving to block 116, the data block, but not the MD5 code, is encrypted with a user-selected key on a user key list. From block 116, the process ends at state 120, it being understood that further transmission steps as previously disclosed can be undertaken.

Subsequently, when the user computer, for example, loses the data packet processed by the steps shown in FIG. 6A and accordingly requests and receives a copy of the packet from the data center 12, the user computer invokes the steps shown in FIG. 6B. Commencing at block 124, the user computer receives the blocks to be restored from the data center and then undertakes the following steps for each block. At block 126, the computer selects the first encryption key in the list, and then at block 128 the computer decrypts and decompresses the block. Moving to decision diamond 130, the user computer determines whether decompression failed as indicated by, e.g., data overflow. If decompression failed, the process moves to block 132 to select the next key in the list, and then loops back to block 128 to again attempt decompression.

If, on the other hand, decompression is determined at decision diamond 130 to have been executed satisfactorily, the process moves to block 136 to further validate the key under test by stripping the digital signature MD5 code from the packet and then calculating anew the digital signature MD5 code of the data that is associated with the decrypted block. In undertaking the process at block 136, the present invention understands that the digital signature MD5 code is a 128 bit-long string that is appended to the data with which it is associated in a known location, and that consequently the digital signature MD5 code easily can be stripped.

At decision diamond 138 the calculated digital signature MD5 code of the decrypted data is compared to the decrypted digital signature MD5 code that had been stripped from the data at block 136. If the two digital signature MD5 codes match each other at decision diamond 138, the key under test has been validated and the process returns "correct key" at block 140. Then the process retrieves the next data portion at block 124. Otherwise, the process loops back to block 132 to retrieve the next key in the user computer's key list.

Figure 7A:
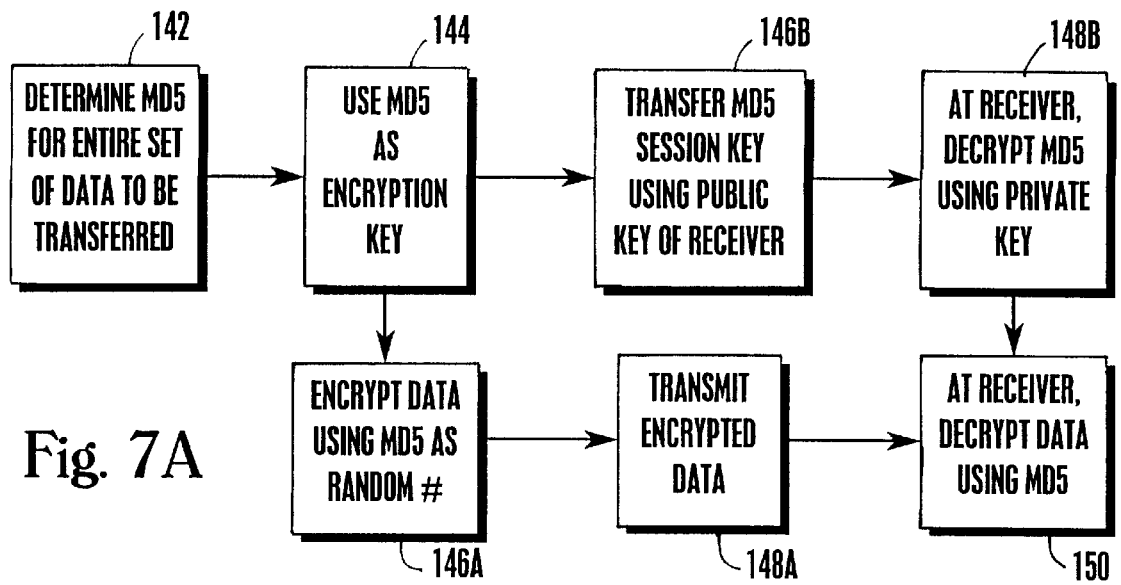
FIG. 7A is a flow chart of the process for transferring data from a user computer to a data center using the message digest (MD)-5 comparison value of the data being transferred as an encryption random number.

FIG. 7A shows a method for providing a unique, session-specific session key for encryption purposes. Commencing at block 142, the digital signature MD5 code for the entire set of data to be transmitted is calculated by the computer that is to transmit the data. Moving to block 144, the digital signature MD5 code is used as the encryption key for the data transmission session. In the event that only 56 bits are required for the key, the two 64 bit halves of the 128 bit-long digital signature MD5 code are combined using an exclusive-OR (XOR) operation and then 8 bits, e.g., the last 8 bits, of the resulting 64 bit string are discarded.

From block 144, the present logic follows two branches, denoted in the Figures as "A" and "B". More specifically, at block 146A the data is encrypted using the digital signature MD5 code (or portion thereof) as a random number, and then at block 148A the data is transmitted to the receiving computer. On the other hand, at block 146B the portion of the digital signature MD5 code that is to serve as the session key (i.e., the portion of the digital signature MD5 code that is used at block 146A to encrypt the data) is transferred from the transmitting computer to the receiving computer using conventional private key/public key encryption principles, or more preferably using Diffie-Helman encryption principles. That is, at block 146B the digital signature code can be encrypted by the transmitting computer using the receiving computer's public key, and then at block 148B the receiving computer can decrypt the digital signature code using its private key. Then, as shown in FIG. 7A, block 150 receives the results of blocks 148A and 148B to decrypt the data using the digital signature code session key.

Figure 7B:
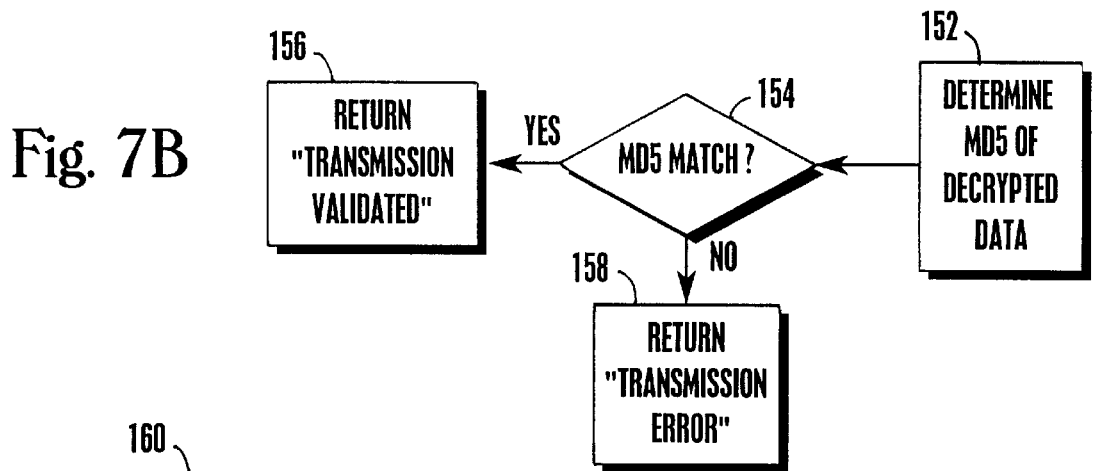
FIG. 7B is a flow chart of the process for validating the data transfer shown in FIG. 7A.

FIG. 7B additionally shows that the present logic can validate the data received at block 152 by undertaking the validation steps shown at blocks 152–158. More particularly, at block 152 the receiving computer calculates the digital signature code of the data that is associated with the decrypted data from block 150. Next, at decision diamond 154 the calculated digital signature code of the decrypted data is compared to the digital signature code that had been received and decrypted at block 148B. It is to be understood that the in the event that only 56 bits of an XOR'd digital signature MD5 code are used as the session key, the comparison at decision diamond 154 can be between the session key and an XOR'd version of the digital signature MD5 code calculated at block 152.

In any case, if the two digital signature codes match each other at decision diamond 154, the session key under test has been validated and the process returns "transmission validated" at block 156. Otherwise, the process returns "transmission error" at block 158.

Figure 8:
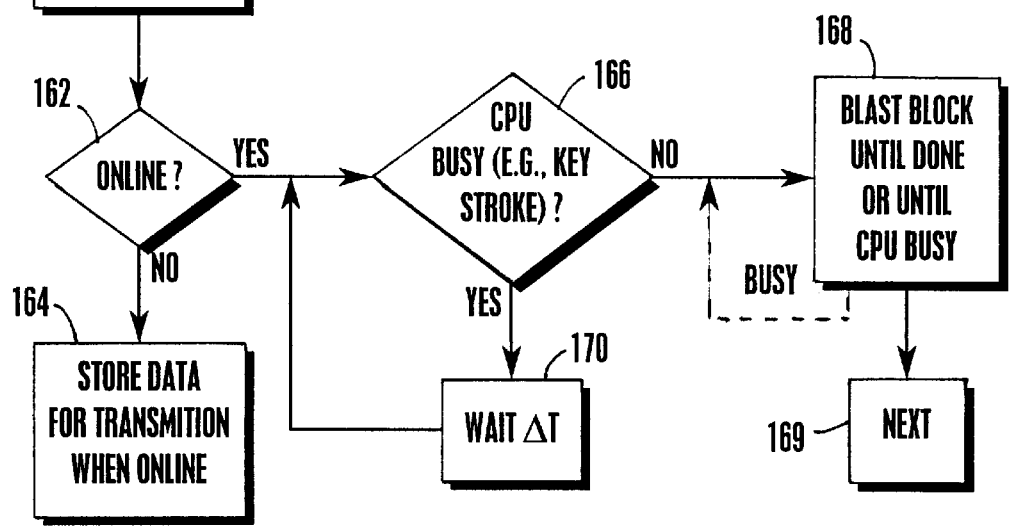
FIG. 8 is a flow chart of the process for continuously backing up the computer files of a user computer while a user is using the computer and the computer is online with a remote data center via a wide area network.

Now referring to FIG. 8, a method is shown for continuous data backup via a wide area computer network while a user computer is online with the network and while a user is using the user computer. Commencing at block 160, upon determination by a user computer that a changed data block is to be backed up in accordance with the principles discussed above (with the exception that a backup start time is not waited for but rather that the process perpetually determines, real-time, data blocks to be backed up), the process moves to decision diamond 162. At decision diamond 162, the process determines whether the user computer is online with the network, e.g., the network 14 shown in FIG. 1. If not, the process moves to block 164 to store the data for transmission thereof when the computer is online.

On the other hand, if, at decision diamond 162, the process determines that the user computer is online with the network, the present logic moves to decision diamond 166 to determine whether the central processing unit (CPU) of the user computer is busy. Specifically, the determination at decision diamond 166 is whether the CPU is busy with a task that has a higher priority assigned to it than the priority of the backup task shown in FIG. 8. If the CPU is not occupied with another task of higher priority than the present data backup task, the process moves to block 168 to transmit the block until the entire block has been transmitted, or until the computer becomes reoccupied with a task of higher priority than backup. It is to be understood that when transmission of a block is interrupted by a higher priority task, the user computer undertakes the higher priority task, and when finished returns to the present data backup task to complete transmission of the data block. The logic then moves to block 169 to determine further blocks for transmission, and to transmit the blocks virtually real-time as the user uses the computer for other tasks.

The loop between block 170 and decision diamond 166, and the "busy" loop at block 168, illustrate the principles of the above discussion. When the CPU is busy at decision diamond 166 with, e.g., the requirement to execute an input event such as a key stroke, the logic can proceed to block 170 to wait a predetermined period Δt, and then retry the determination at decision diamond 166. It will be appreciated that the length of Δt is very short, on the order of milliseconds or microseconds. Alternatively, the logic can essentially define "Δt" to be "whenever the CPU is idle", and when the CPU is idle, proceed to block 168 to transmit data.

For example, during the test at decision diamond 166, the CPU might receive a data input via a key stroke by the user of the computer, and if so, the process idles at block 170 until the key stroke is completed, before transmitting data at block 168. Thus, in one embodiment the present process transmits backup data between CPU tasks that support a user's needs, e.g., between key strokes, with the data that is changed by the key strokes being determined as backup data and transmitted offsite via the Internet for storage virtually real time as the data is being created by the user of the computer.

While the particular SYSTEM AND METHOD FOR BACKING UP COMPUTER FILES OVER A WIDE AREA COMPUTER NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A system for backing up files in user computers, comprising:

a data center including a common library of computer data;

a plurality of user computers remote from the data center and in communication with the data center;

common library logic means for determining which if any of data blocks of the user computers are common computer file blocks by virtue of being contained in the common library, computer file blocks that are determined not to be common computer file blocks being non-common file blocks; and common library addition means for adding to the common library a non-common file block when the non-common file block appears at least a predetermined number of times in the user computers.

2. The system of claim 1, further comprising:

initialization logic means associated with each user computer for causing file blocks except common file blocks to be transmitted to the data center;

subfile incremental back up logic means associated with each user computer for determining changed blocks that have been changed since a predetermined back up time and generating changed block signals in response thereto;

chunk transmission logic means responsive to the subfile incremental logic means for sending only changed blocks to the data center in chunks having a predetermined size;

synchronizing logic means responsive to the changed block signals for synchronizing the subfile incremental logic means; and logic means for generating a listing of the blocks of the files stored at the data center and, associated with each block, the first two characters of the block and a digital signature of the block, the subfile incremental logic means using the listing to undertake the determining function.

3. The system of claim 1, wherein a non-common file block is added to the common library when the non-common file block appears in at least a predetermined number of user computers.

4. The system of claim 2, further comprising:

logic means for periodically copying remote versions at the data center onto a portable data storage medium; and logic means for restoring local files by copying remote versions from the portable data storage medium when the remote versions stored on the portable data storage medium are at least as current as the remote versions stored at the data center, and otherwise restoring local files by copying remote versions from the data center.

5. A computer-implemented method for backing up at least one local computer file from at least one user computer in a computer network, comprising:

(a) transmitting the local file to a data center remote from the user computer to render a remote version, the data center being accessible via the computer network; (b) receiving changes to at least a first block of the local file, the changes being established by a user of the user computer generating input events;

(c) immediately upon receiving the changes, designating at least the first block as a transmission block to be transmitted to the data center for updating the remote version;

(d) transmitting at least the first block to the data center substantially while the user is generating input events;

(e) for each of the blocks in the local file copying two respective characters thereof defining respective first comparison values and generating respective digital signature codes defining second comparison values;

(f) for each block, periodically determining a test digital signature code and comparing it to the respective second comparison value: and (g) when the test digital signature code of a block does not equal the respective second comparison value, determining whether the first two characters of the block equal one of the first comparison values.

6. The computer-implemented method of claim 5, wherein the transmitting step is undertaken between input events.

7. The computer-implemented method of claim 5, further comprising the steps of:

(h) when the first two characters equal one of the first comparison values, determining a block digital signature code using a test byte$_i$ as the first byte of a test block;

(i) determining whether the block digital signature code equals one of the second comparison values;

(j) when the block digital signature code equals one of the second comparison values, returning "resynchronized"; otherwise (k) when either the first two characters of the test byte$_i$ do not equal one of the first comparison values, or when the block digital signature code does not equal one of the second comparison values, setting i=i+1 and repeating select steps.

8. The computer-implemented method of claim 7, further comprising the steps of:

for at least some of the local file blocks, determining whether a duplicate of the local file block is stored in a common file block library at the data center; and undertaking step (a) only when a duplicate of the local file block is not stored in a common file block library.

9. The computer-implemented method of claim 8, further comprising the steps of:

periodically copying remote versions at the data center onto a portable data storage medium; and restoring local file blocks by copying remote versions from the portable data storage medium when the remote versions stored on the portable data storage medium are at least as current as the remote versions stored at the data center, and otherwise restoring local file blocks by copying remote versions from the data center.

10. A method for backing up data in a system including user computers and at least one data storage facility, comprising the steps of:

at a user computer, determining whether data associated with the user computer is resident in a common software library associated with the data storage facility;

not backing up the data when the data is resident in the common software library; and automatically adding the data to the common software library when the data is present in at least a predetermined number of user computers in the system.

* * * * *